US012617193B2

(12) United States Patent
Dandrea

(10) Patent No.: US 12,617,193 B2
(45) Date of Patent: May 5, 2026

(54) ELECTRICALLY CONDUCTIVE CORROSION RESISTANT BODIES OF LOW PERMEABILITY

(71) Applicant: Jay Dandrea, Pittsburgh, PA (US)

(72) Inventor: Jay Dandrea, Pittsburgh, PA (US)

(73) Assignee: ELEKTRODA, LLC, Pittsburgh, PA (US)

( * ) Notice: Subject to any disclaimer, the term of this patent is extended or adjusted under 35 U.S.C. 154(b) by 37 days.

(21) Appl. No.: 18/367,033

(22) Filed: Sep. 12, 2023

(65) Prior Publication Data

US 2024/0001660 A1    Jan. 4, 2024

Related U.S. Application Data

(63) Continuation of application No. 17/752,484, filed on May 24, 2022, now abandoned.

(51) Int. Cl.
B32B 27/32      (2006.01)
B32B 9/00       (2006.01)

(52) U.S. Cl.
CPC .............. B32B 27/32 (2013.01); B32B 9/007 (2013.01); B32B 2307/202 (2013.01); B32B 2307/7242 (2013.01); B32B 2323/04 (2013.01)

(58) Field of Classification Search
CPC ... B32B 27/32; B32B 9/007; B32B 2307/202; B32B 2307/7242; B32B 2323/04; B32B 5/16; B32B 9/045; B32B 2250/02; B32B 2250/03; B32B 2264/108; B32B 2307/72; B32B 27/20
See application file for complete search history.

(56) References Cited

U.S. PATENT DOCUMENTS

| | | | | |
|---|---|---|---|---|
| 2010/0196716 A1* | 8/2010 | Ohta | ....................... | B32B 9/045 |
| | | | | 428/408 |
| 2018/0023904 A1* | 1/2018 | Kato | ....................... | B32B 27/38 |
| | | | | 165/80.2 |
| 2018/0126693 A1* | 5/2018 | Tsukamoto | ............... | B32B 5/18 |
| 2019/0371486 A1* | 12/2019 | Song | ....................... | B32B 9/045 |
| 2020/0116443 A1* | 4/2020 | Lin | ......................... | B32B 5/245 |
| 2021/0086474 A1* | 3/2021 | Seo | ......................... | B32B 3/263 |
| 2021/0088139 A1* | 3/2021 | Kirschbaum | ......... | B32B 27/322 |

\* cited by examiner

*Primary Examiner* — Scott R. Walshon
(74) *Attorney, Agent, or Firm* — Jeffrey D. Mulrooney

(57) ABSTRACT

An electrically conductive, corrosion resistant carbon-based sheet with low permeability to liquids and gases and a method for its manufacture. A multilayer laminate consisting of polymeric film laminated with expanded graphite foil is produced by compressing the layers under heated conditions. The resulting laminate can be used to produce a current collector or a bipolar layer in an electrochemical cell.

13 Claims, 5 Drawing Sheets

FIG. 1a

ELECTRICALLY CONDUCTIVE CORROSION RESISTANT BODIES OF LOW PERMEABILITY

CROSS-REFERENCE TO RELATED APPLICATIONS

This application is based on claims priority to U.S. patent application Ser. No. 17/752,484 filed May 24, 2022 entitled "ELECTRICALLY CONDUCTIVE CORROSION RESISTANT BODIES OF LOW PERMEABILITY".

FIELD OF THE INVENTION

This invention relates to an electrically conductive sheet of low permeability made of a laminate comprised of one or more layers of expanded graphite foil and one or more layers of a polymeric film, a process for producing such a film, and a component for an electrochemical device.

BACKGROUND OF THE INVENTION

In an electrochemical device of monopolar design multiple anode-cathode pairs are connected in parallel by a connection outside of the active area of the cell. Multiples of these cells are then connected in series to increase the voltage of the device to the level required by the application. In a bipolar design, individual cells are stacked directly adjacent one another to increase voltage. The discrete cells are separated by a component known as the bipolar layer. Bipolar construction can be applied to any type of electrochemical device, such as batteries, fuel cells, electrolyzers, or flow batteries, and has the potential advantages of being more compact, lighter, cheaper, and having lower internal resistance than an energy equivalent device of monopolar design.

A challenge encountered when designing devices of bipolar design comes in the form of the bipolar layer. For the bipolar layer to effective, it must have good electronic conductivity, but be impermeable to ions and gases. Additionally, the material must be electrochemically stable at both anodic and cathodic potentials. Few materials meet these requirements, and solutions to the bipolar layer problem have historically been elaborate and expensive. Materials currently used for bipolar layers are typically either metals or carbon-based. Metals are attractive due to their higher specific electrical conductivity, high strength, and their ability to be formed by conventional means such as stamping, but are susceptible to corrosion. More corrosion resistant metals such as titanium and stainless steel are expensive, more difficult to process, and still often require coatings to slow the corrosion rate, and while the materials themselves may be of high conductivity, these coatings tend to introduce a high contact resistance between the bipolar layer and the gas diffusion layer of a fuel cell or the electrode of a battery.

Graphite is inert to most chemical reactions and has good electrical conductivity, making it a suitable candidate for a bipolar layer. Recompressed expanded graphite is preferred over solid graphite as a material for a bipolar layer as it can be more easily formed, is of lower cost and possesses better mechanical properties. A typical process for producing recompressed flexible graphite foil is described in U.S. Pat. No. 3,404,061. This method involves mixing natural graphite flakes with an oxidizing agent and then subjecting the mixture to high heat, which causes the graphite flakes to expand. When the expanded graphite flakes are then recompressed, the individual flakes of the expanded graphite interlock with one another resulting in a flexible foil. However, as bodies made from recompressed expanded graphite are inherently porous, additional processing is required in order to make them impermeable to liquids and gases.

The porosity of expanded graphite-based bodies has traditionally been removed by vacuum impregnation of the body with a resin. As the resin only fills in existing voids in the material, the electrical conductivity of the impregnated material is comparable to the previously porous foil. U.S. Pat. No. 4,729,910 describes a method for impregnating flexible expanded graphite sheet with a liquid thermosetting resin in the interest of improving mechanical strength and reducing gas permeability. A similar process is described in U.S. Pat. No. 6,746,771, wherein the resulting impregnated sheet has the application of a bipolar plate for a fuel cell. These impregnation processes have the disadvantage of being slow and requiring large capital investments, and as such, the resulting product is of considerable cost.

It is an object of this invention to produce a laminated material comprised of alternating layers of expanded graphite sheet and polymeric film which has bulk properties of electrical conductivity and low permeability comparable to that of resin impregnated expanded graphite at a greatly reduced cost.

Methods of laminating expanded graphite sheets have been described previously. U.S. Pat. No. 3,404,061 details laminating two superposed flexible graphite sheets with a strengthening layer of a dissimilar material interposed between the two sheets using an adhesive such as tar, carbon cement, or thermoset resin. U.S. Pat. No. 5,128,209 describes a composite gasket material comprised of alternating layers of expanded graphite sheet and a porous fluoropolymer film in which the layers are joined with an adhesive. The adhesive may be thermoset, thermoplastic, or reaction curing. U.S. Pat. Nos. 5,198,063 and 6,270,083 teach a method of reinforcing flexible graphite by laminating the graphite with a thermoplastic film under heat and pressure without the need for additional adhesives. These methods are proposed primarily in the interest of increasing the strength of the graphite foil, and make no claims relating to the electrical conductivity or permeability of the laminate.

US Patent Application Pub. No. 2019/0371486 discloses an electrically conductive graphite composite sheet wherein a layer of polyethylene or polypropylene combined with a reinforcing agent consisting of graphite and/or graphene along with a fluoropolymer additive, is interposed between the graphite layers. The degree to which the composite sheet is electrically conductive is not clear, as measured values of resistance are not normalized to specific resistivity. Details of permeability are not divulged.

A method of making an electrically conducting, ion insulating connector comprised of a layered component of expanded graphite foil is described in U.S. Pat. No. 4,014,730. The method consists of applying a composition of an elastomer combined with an electrically conductive filler to one surface of a sheet of graphite foil, covering the elastomer coating with a second sheet of graphite foil, compressing the composite, and vulcanizing the laminate under pressure. A method for producing a bipolar plate for a fuel cell (U.S. Pat. No. 8,597,453) describes a similar process, using epoxy or vinyl ester resin in place of the elastomer. In both cases the intermediate layer is applied in a viscous form and an additional curing step is required.

No currently available materials or methods can produce an economical bipolar layer. It is an object of this invention to produce a material having bulk properties which can satisfy the functional requirements for a bipolar layer using low-cost materials and simple methods of manufacturing, thereby largely reducing the cost of the bipolar layer.

SUMMARY OF THE INVENTION

It is an object of the invention to provide laminated bodies, such that the resulting composite is electrically conductive, corrosion resistant, and of low permeability to liquids and gases, and a process for producing such bodies.

It is an object of one embodiment of the present invention for the laminated body to be composed of alternating layers of expanded graphite foil and polymer film.

It is an object of one embodiment of the present invention for the laminated body to be composed of two layers of expanded graphite foil with a single layer of the polymer film, wherein the polymer film is laminated between the two layers of expanded graphite foil.

It is an object of one embodiment of the present invention for the laminated body to be composed of a single layer of expanded graphite foil laminated to a single layer of the polymer film.

It is an object of one embodiment of the present invention for the laminated body to be composed of a single layer of expanded graphite foil and two layers of the polymer film, wherein the graphite foil is laminated between the two sheets of the polymer film.

It is an object of one embodiment of the present invention that the polymer layer is polyethylene.

It is an object of one embodiment of the present invention that the polymer layer is an electrically conductive filled composition of carbon in a polymer matrix.

It is an object of one embodiment of the present invention that the polymer layer is an electrically conductive filled composition of carbon and polyethylene.

It is an object of one embodiment of the present invention that the laminated bodies are formed by applying heat and pressure to the layered stack of materials comprising the laminate, where the temperature is above the softening point of the polymer layer.

It is an object of one embodiment of the present invention that the laminated bodies are formed by applying heat and pressure to the stack of materials comprising the laminate, where the temperature is above the softening point of the polymer layer, and the lamination occurs in the nip of heated calender rolls.

It is an object of one embodiment of the present invention that the laminated bodies formed by the previously mentioned method of applying heat and pressure in the nip of heated calender rolls, is done in a continuous, roll-to-roll process.

It is an object of one embodiment of the present invention the laminated material produced by the continuous, roll-to-roll process can be stamped or cut into individual laminated bodies.

It is an object of one embodiment of the present invention that the laminated bodies may serve as a bipolar layer or a current collector for an electrochemical device such as a battery, flow battery, fuel cell, or electrolyzer.

A strong, flexible, electrically conductive sheet, with low permeability to gases and liquids, which can be manufactured at low-cost in a roll-to-roll lamination process. The laminate is constructed of alternating layers of expanded graphite foil and a polymeric film and contains one or more layers of the expanded graphite foil and one or more layers of the polymer film.

When the layers are compressed together under heated conditions, the polymer layer softens and is pressed into the vacancies in between the graphite flakes of the expanded graphite foil, sealing off the porosity of the graphite foil, and largely reducing the permeability of the laminate.

Electrical conductivity in the through-plane direction is defined as the direction normal to the area of in which the lamination occurs, requiring the electrical current to pass through each of the layers in series. As polymer materials are generally electrically insulating, it is non-intuitive that a layer of such a material can be placed adjacent to and in contact to a layer of electrically conductive material and that the composite demonstrates properties of electrical conductivity. However, as a result of the lamination process described herein, the individual flakes of expanded graphite that comprise the graphite foil breach through the polymer layer allowing the laminate to maintain good electrical conductivity through the polymer layer even though the polymer layer itself may be electrically insulating. This phenomenon additionally enables the laminated structure to have a lower specific resistivity than the sum of the individual layers.

The graphite foil layer can have a thickness of between 0.100 mm and 1 mm, and a density of between 0.7 g/cm$^3$ and 1.8 g/cm$^3$. At the larger thickness and higher density, the graphite foil becomes brittle and less flexible, making roll-to-roll manufacture difficult. The process is compatible with graphite foils of all purity levels, and the purity level of the graphite foil is only dictated by the final application in which the laminate is to function. As such, graphite foil of low purity can be used where allowable, which considerably reduces the cost of the raw material and therefore reduces the cost of the final product.

The polymer layer is preferably a thermoplastic material such as polypropylene, polyvinyl chloride, high-density polyethylene, low-density polyethylene, polystyrene, polyethylene terephthalate. The polymer layer can have a thickness of between 0.010 mm and 1 mm. If the polymer layer is too thin, the porosity of the graphite foil layer or layers may not be sufficiently sealed and the permeability of the resulting laminate will be too high. Thicker polymer layers will increase the strength and reduce the permeability of the laminate, though electrical resistance will increase.

If the polymer layer is placed in between the two sheets of expanded graphite foil, it is not necessary for the polymer layer to be electrically conducting for the laminated body to be electrically conducting in the through-plane direction, though the electrical conductivity of the laminate in the through-plane direction can be improved by the use of polymer films to which a conductive filler has been added to make the polymer film electrically conductive. The conductive filler may be metallic or carbonaceous in nature. Metallic fillers may include particles of silver, gold, platinum, nickel, palladium, niobium, or other metals. Carbonaceous fillers may be selected from a group which includes carbon, graphite, expanded graphite, conductive carbon fibers or papers, graphene, and carbon nanotubes. Carbon-based fillers are preferred due to their lower cost and higher chemical stability. Carbon filled electrically conductive polymer films are commercially produced for a wide variety of applications such as anti-static packaging, transcutaneous electrical nerve stimulation (TENS) electrodes, pressure sensors, and for shielding from electromagnetic interference, and are marketed under trade names such as LINQSTAT. The conductive polymer films may have a specific resistivity of between 0.1 ohm-cm and 10,000 ohm-cm.

For the layers to be effectively laminated together, they must be subjected to sufficient pressure at a temperature above the softening point of the polymer, but below the temperature at which decomposition of the polymer layer can occur. The lamination can be performed either in a press with heated platens or in a calender with heated rolls. The calender method is preferred for production reasons as it can be done continuously in a roll-to-roll process. If the laminated body is of the one of the embodiments wherein the polymer film is on the exterior of the laminated body, and therefore in direct contact with either the press platens or the calender rolls, then the temperature of the platens or rolls should be below the melting point of the polymer film, else the polymer film will stick to the platens or rolls and be damaged. Additionally, a sacrificial layer of a third material, which can remain largely dimensionally stable during the lamination process and has non-stick properties with regards to both the polymer film and platens or rolls, can be placed between the polymer layer and the platens or calender rolls. After the laminate is formed, successive calendering of the material at higher pressures can further reduce the thickness, and increase the density of the laminate.

DETAILED DESCRIPTION OF THE INVENTION

Figures 1, 1A:
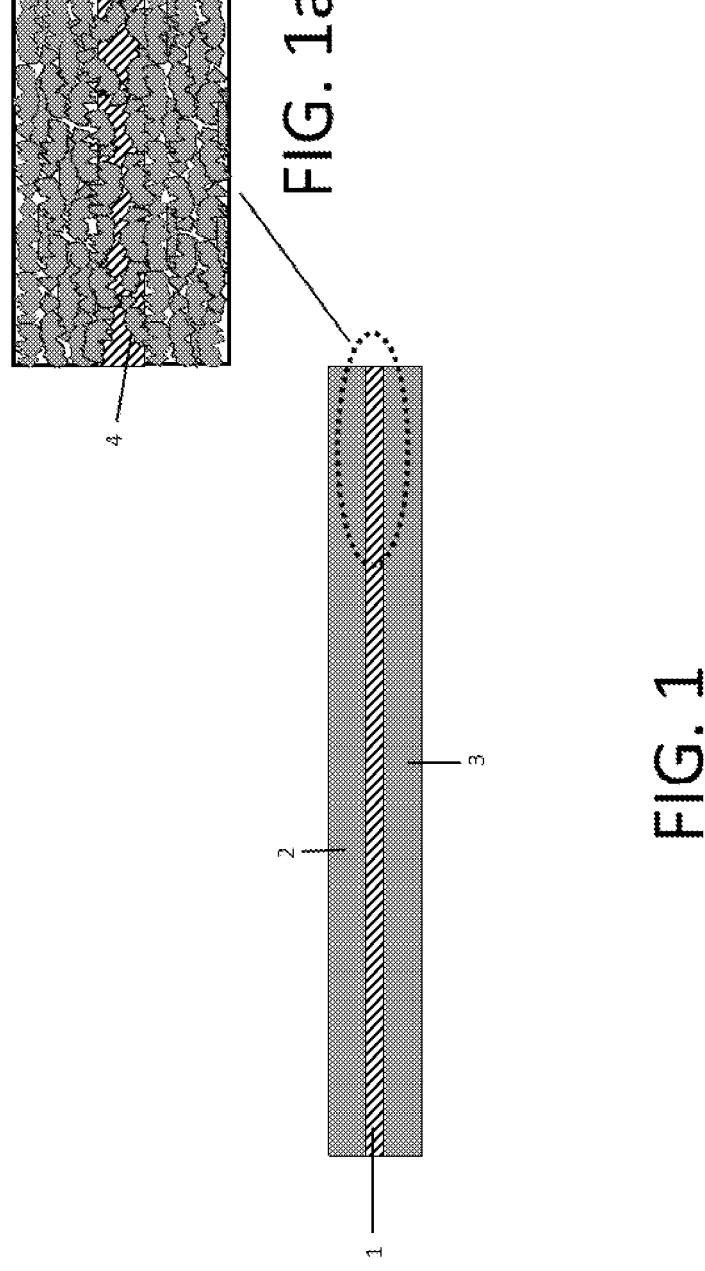
FIG. 1 depicts a side view of one embodiment of the invention wherein the laminated body is comprised of a single layer of polymer film laminated between two layers of expanded graphite foil.

Prior to proceeding with the more detailed description of the present invention it should be noted that, for the sake of clarity, identical components which have identical functions have been designated by identical reference numerals throughout the several views illustrated in the drawings.

FIG. 1 depicts one embodiment in which a laminated body having two exterior layers 2, 3 of expanded graphite foil are laminated together with an interior layer of a polymer film 1. The exterior layers 2, 3 remain porous near the exterior surfaces while the polymer layer 1 renders the central area of the laminate largely impermeable to gases and liquids. The porosity of the exterior graphite foil layers can be reduced by increasing the lamination pressure or by additional calendering of the formed laminate. The polymer film 1 can be either a filled or non-filled composition. In either case, individual flakes of the expanded graphite foil layer may pierce through the polymer layer as shown in 4 and the laminate will be electrically conductive in the through plane direction.

Figure 2:
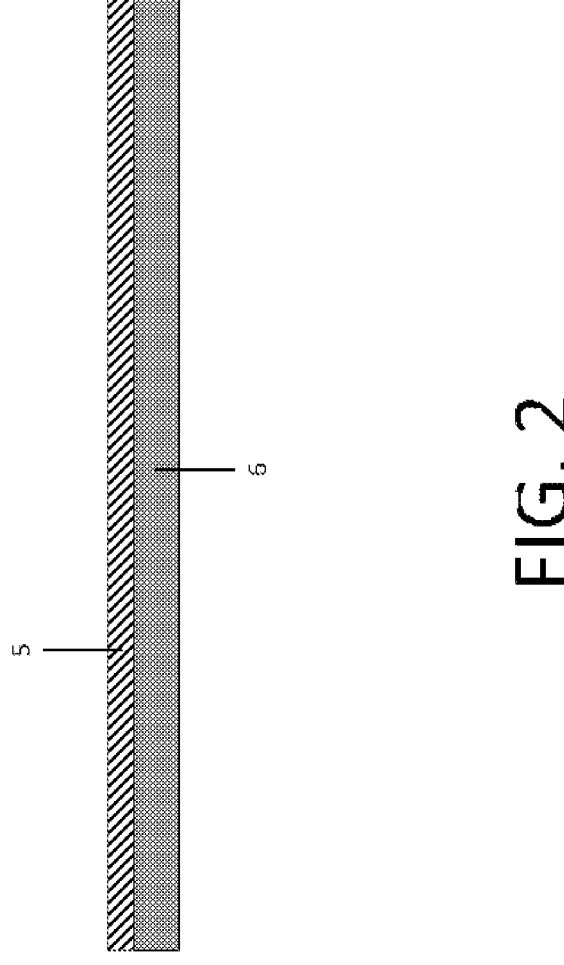
FIG. 2 depicts a side view of one embodiment of the invention wherein the laminated body is comprised of a single layer of polymer film laminated with a single layer of expanded graphite foil.

FIG. 2 depicts one embodiment in which a laminated body having a layer of polymer film 5 is laminated to a layer of expanded graphite foil 6. The polymer layer 5 will render the laminate largely impermeable to liquids and gases through the plane of the laminated body even though the graphite foil layer 6 will be porous towards the surface away from the polymer layer 5. The porosity of the expanded graphite foil layer can be reduced by increasing the lamination pressure or additional calendering of the formed laminate. The polymer layer 5 should be comprised of a filled composition of a polymer and carbon in order to make the laminate sufficiently electrically conductive in the through-plane direction.

Figure 3:
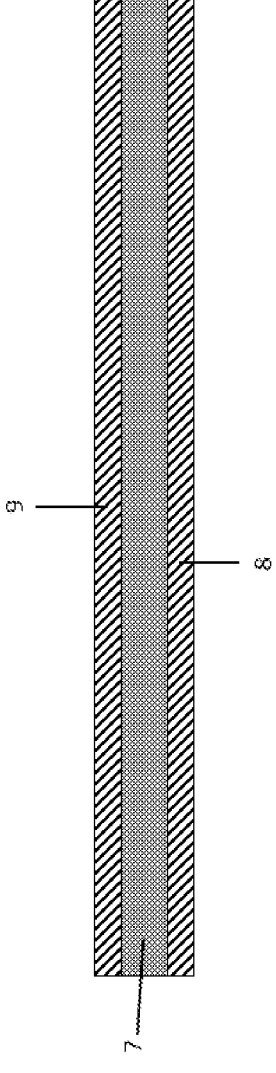
FIG. 3 depicts a side view of one embodiment of the invention wherein the laminated body is comprised of a single layer expanded graphite foil laminated between two sheets of polymer film.

FIG. 3 depicts one embodiment in which a laminated body having two exterior layers 8, 9 of polymer film is laminated together with an interior layer 7 of expanded graphite foil. The laminated body is largely impermeable to gases and liquids due to the presence of the two polymer layers 8, 9. This embodiment has the advantage of not exposing the porosity of the expanded graphite foil or impurities present in the graphite foil to the chemical environment of the application. The density of the laminated body can be increased by increasing the lamination pressure or by additional calendering of the formed laminate. The polymer layers 8, 9 should be comprised of a filled composition of a polymer and carbon in order to make the laminate sufficiently electrically conductive in the through-plane direction.

Figure 4:
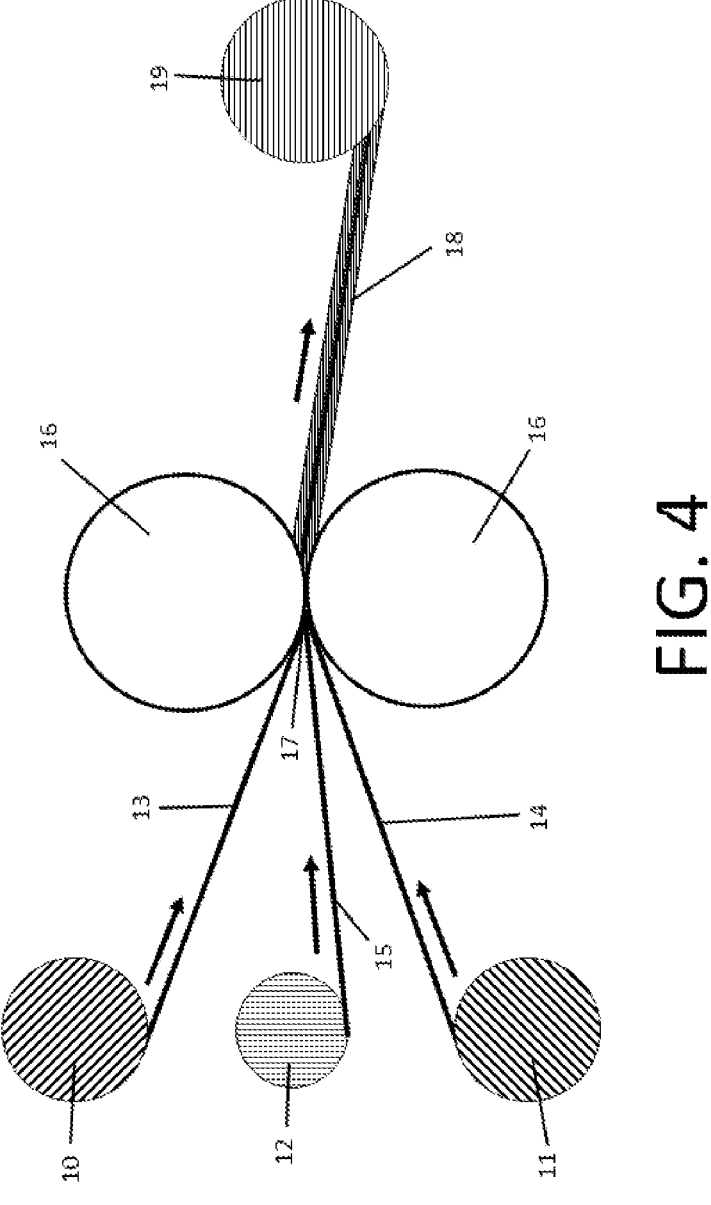
FIG. 4 depicts a roll-to-roll process for producing the laminated bodies.

FIG. 4 depicts a continuous roll-to-roll process for producing laminated bodies which are the object of this invention. Rolls of expanded graphite foil and polymer film are loaded on to unwind shafts at 10, 11, 12. If graphite foil is at the unwind shafts at 10, 11, then the polymer film will be loaded at the unwind shaft 12. If polymer film is at the unwind shafts at 10, 11, then the graphite foil will be loaded at the unwind shaft 12. For a laminated body of the embodiment in FIG. 2, one of the unwind shafts will be eliminated and one unwind shaft will hold graphite foil while the other will hold the polymer film. The films 13, 14, 15 are aligned and fed from their respective rolls into the calender nip 17. Pressure is exerted on the film by the calender rolls 16 which are heated. The calender rolls 16 may be heated electrically or by circulating a fluid such as water or oil through the rolls. The laminated body 18 exits the calender nip and is collected at the wind-up shaft 19. The roll of the laminated material produced by this method can then be cut into individual components by conventional means such as stamping.

Figure 5:
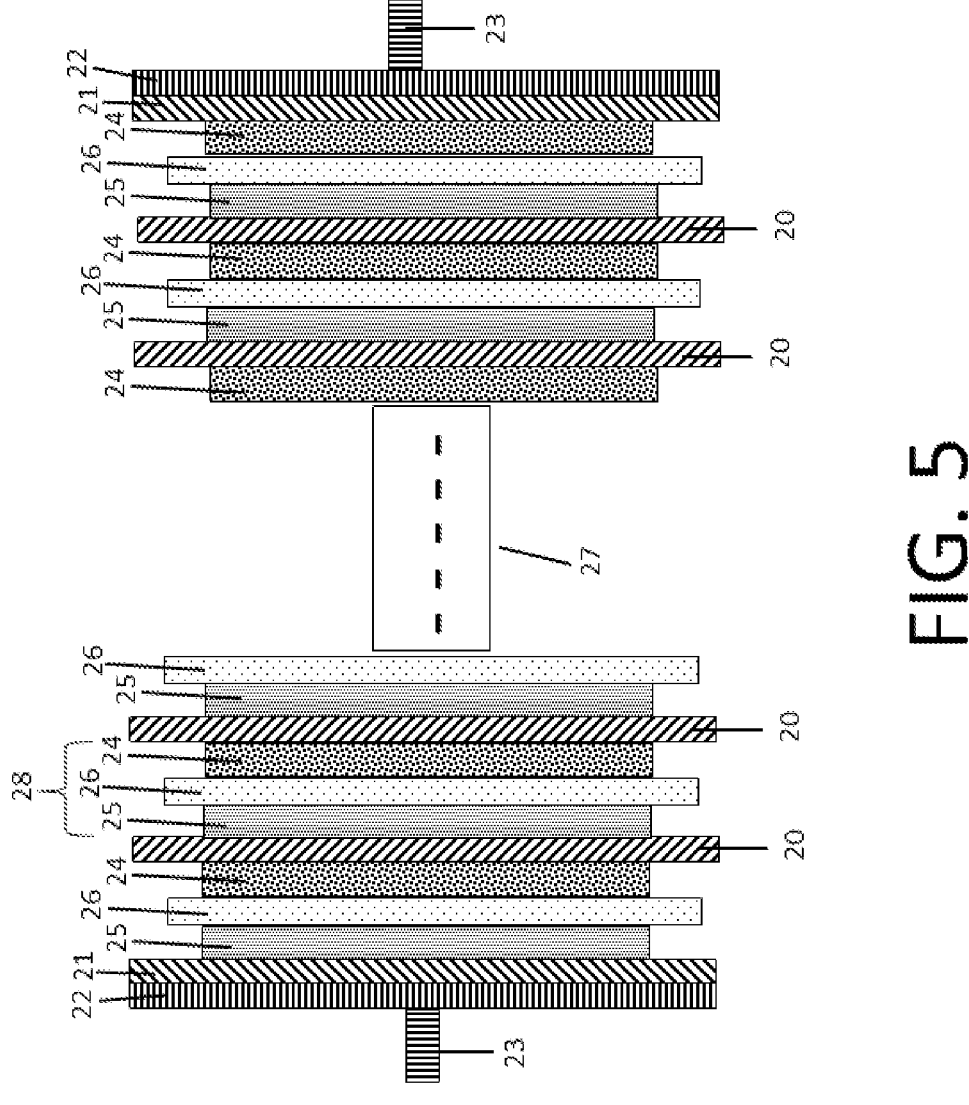
FIG. 5 depicts an electrochemical device of bipolar construction.

FIG. 5 depicts an electrochemical cell of bipolar construction. An individual cell 28 consists of an electrochemically active anode 24 and an electrochemically active cathode 25 electronically insulated from one another by an ionically conducting separator or membrane 26. The individual cells are stacked together in series in order to increase the terminal voltage of the device. The adjacent cells are connected by the bipolar layer 20, which must be electronically conducting but impermeable to ions and gases. Any plurality 27 of these individual cells can be connected in series, where the number of individual cells will depend on the individual cell voltage and the total voltage required by the application. Current is collected at an end plate or current collector 22 which are then connected to the external terminals 23. It is often desirable for the end plate/current collector and terminal be made from metals due to their high conductivity and high strength. However, it is often the case that the metals chosen will not be electrochemically stable in the environment of the cells. A shield 21 with properties similar to those of the bipolar layer is then necessary to prevent corrosion of the end plate/current collector. The object of this invention may be utilized as either the bipolar layer 20 or the end plate/current collector shield 21.

EXAMPLES

Examples of the object of the invention were produced and the electrical conductivity and air permeability of the laminated bodies was measured. For measuring electrical resistivity, a 28 mm disk was punched from the examples and pressed between two gold plated electrodes at a pressure of 222 psi. The electrical resistance in the through-plane direction was then measured by connecting a device (Hewlett Packard 4338A) to the electrodes. The resistance was then normalized to the thickness and area of the sample and the electrical resistivity ($\rho$) is reported in units of Ohm-cm ($\Omega$-cm).

The air permeability of the sample was determined by placing a 28 mm disk of the sample to be measured in a custom-made cylinder which separates at the center. The disk then divides the cylinder into 2 separate chambers. Dry compressed air is maintained in the first chamber at a pressure of 2 psi. For a porous material, the air then diffuses through the sample and is collected in the second chamber, whose volume is known. The diffusing air causes a pressure increase in the second chamber which is measured by a pressure transducer (Omega PX409-015CGUSBH). The pressure increase was measured for a period of 30 min and the rate of the pressure increase normalized to the area of the sample and the air pressure in the first chamber. The permeability (Pe) is then reported in units of $cm^3/(m^2\text{-s-Pa})$. If no pressure increase was observed after 30 min, the permeability is taken to be below the measurement threshold and is reported as "0".

For all of the examples, the graphite foil layer(s) consist of a low-grade (99% purity) expanded graphite foil with a nominal thickness of 0.210 mm and density of 1.13 $g/cm^3$. The electrical resistivity of the graphite foil was measured to be 0.08 $\Omega$-cm. The air permeability of the graphite foil was measured to be $4.45\times10^{-2}$ $cm^3/(m^2\text{-s-Pa})$.

With the exception of Example 7, the lamination was performed in a 2-roll calender (Farrel Corporation) with electrically heated rolls having a diameter of 3 inches and a length of 7 inches. For the laminate of Example 7, the lamination was performed in a single nip of a 4-roll L-calender (Farrel Corporation) having rolls of a diameter of 8 inches and a length of 16 inches. Heating of the rolls was accomplished by circulation of pressurized water through the rolls, which are cored.

Example 1

A single sheet of expanded graphite foil with an area of 130.65 $cm^2$ was placed in contact with a single sheet of carbon filled high-density polyethylene of the same area having a thickness of 0.076 mm, a density of 1.10 $g/cm^3$, and a bulk resistivity of 50 $\Omega$-cm such that the planes of both sheets were parallel and the edges aligned. The sheets were fed through the nip of a calender at a rate of 3 feet per minute. The calender rolls were heated to a surface temperature of 100° C. and the calender nip was adjusted to 0.050 mm. A laminated body with a thickness of 0.222 mm and a density of 1.41 $g/cm^3$ was produced.

Example 2

A single sheet of expanded graphite foil with an area of 130.65 $cm^2$ was placed in contact with a single sheet of carbon filled high-density polyethylene of the same area having a thickness of 0.100 mm, a density of 1.05 $g/cm^3$, and a bulk resistivity of 800 $\Omega$-cm such that the planes of both sheets were parallel and the edges aligned. The sheets were fed through the nip of a calender at a rate of 3 feet per minute. The calender rolls were heated to a surface temperature of 105° C. and the calender nip was adjusted to 0.080 mm. A laminated body with a thickness of 0.258 mm and a density of 1.27 $g/cm^3$ was produced.

Example 3

A single sheet of expanded graphite foil with an area of 130.65 $cm^2$ was placed in between two sheets of carbon filled high-density polyethylene of the same area having a thickness of 0.076 mm, a density of 1.10 $g/cm^3$, and a bulk resistivity of 50 $\Omega$-cm such that the planes of the three sheets were parallel and the edges aligned. The sheets were fed through the nip of a calender at a rate of 3 feet per minute. The calender rolls were heated to a surface temperature of 105° C. and the calender nip was adjusted to 0.075 mm. A laminated body with a thickness of 0.277 mm and a density of 1.31 $g/cm^3$ was produced.

Example 4

A single sheet of carbon filled high-density polyethylene with an area of 337.1 $cm^2$ having a thickness of 0.076 mm, a density of 1.10 $g/cm^3$, and a bulk resistivity of 50 $\Omega$-cm was placed in between two sheets of expanded graphite foil of the same area such that the planes of the three sheets were parallel and the edges aligned. The sheets were fed through the nip of a calender at a rate of 3 feet per minute. The calender rolls were heated to a surface temperature of 115° C. and the calender nip was adjusted to 0.330 mm. A laminated body with a thickness of mm and a density of 1.14 $g/cm^3$ was produced.

Example 5

A single sheet of carbon filled high-density polyethylene with an area of 130.65 $cm^2$ having a thickness of 0.100 mm, a density of 1.05 $g/cm^3$, and a bulk resistivity of 800 $\Omega$-cm was placed in between two sheets of expanded graphite foil of the same area such that the planes of the three sheets were parallel and the edges aligned. The sheets were fed through the nip of a calender at a rate of 3 feet per minute. The calender rolls were heated to a surface temperature of 115° C. and the calender nip was adjusted to 0.356 mm. A laminated body with a thickness of mm and a density of 1.25 $g/cm^3$ was produced.

Example 6

A single sheet of low-density polyethylene with an area of 337.1 $cm^2$ having a thickness of 0.067 mm, a density of 0.94 $g/cm^3$, and a bulk resistivity of $\sim10^{15}$ $\Omega$-cm was placed in between two sheets of expanded graphite foil of the same area such that the planes of the three sheets were parallel and the edges aligned. The sheets were fed through the nip of a calender at a rate of 3 feet per minute. The calender rolls were heated to a surface temperature of 85° C. and the calender nip was adjusted to 0.330 mm. A laminated body with a thickness of mm and a density of 1.03 $g/cm^3$ was produced.

Example 7

Two rolls of expanded graphite foil, 12.5 inches in width, were load onto unwind shafts and fed into a calender nip. A 12-inch-wide roll of carbon filled high-density polyethylene having a thickness of 0.1 mm, a density of 1.07 g/cm³, and a bulk resistivity of 145 Ω-cm was loaded onto a third unwind shaft and fed into the calender nip such that it was in between the two films of expanded graphite foil. The calender rolls were heated to a surface temperature of 110° C. and the calender nip was adjusted to 0.152 mm. The three films were fed continuously through the nip at a rate of 2.5 feet per minute for approximately 30 minutes, producing approximately 75 feet of a laminated film which was collected into a roll on a wind-up shaft. The laminated body had a thickness of 0.488 mm and a density of 1.26 g/cm³.

Example 8

An individual piece of laminated material having an area of about 100 cm² was cut from the roll of material produced in Example 7. The piece of material was then passed through the calender nip two additional times, each time successively decreasing the gap of the calender nip. The calender rolls were heated to a surface temperature of 100° C. The resulting laminated body had a final thickness of 0.352 mm and a density of 1.51 g/cm³.

Example 9

An individual piece of laminated material having an area of about 100 cm² was cut from the roll of material produced in Example 7. The piece of material was then passed through the calender nip two additional times, each time successively decreasing the gap of the calender nip. The calender rolls were at an ambient temperature of 22° C. The resulting laminated body had a final thickness of 0.376 mm and a density of 1.49 g/cm³.

Comparative Example 1

Comparative example 1 is a low-grade, non-impregnated expanded graphite foil of the type used to produce the laminated bodies in Examples 1-7.

Comparative Example 2

Comparative example 2 is a commercially available, polymer impregnated expanded graphite foil (SGL Corporation) having a thickness of 0.62 mm and a density of 1.70 g/cm³.

TABLE 1

| Type | ρ [Ω-cm] | Pe [cm³/(m²-s-Pa)] |
| --- | --- | --- |
| Example 1 | 2.40 | 0 |
| Example 2 | 65.2 | 0 |
| Example 3 | 0.89 | 0 |
| Example 4 | 0.71 | 0 |
| Example 5 | 9.25 | 0 |
| Example 6 | 18 | 0 |
| Example 7 | 0.21 | 0 |
| Example 8 | 0.46 | 0 |
| Example 9 | 0.19 | 0 |
| Comparative Example 1 | 0.08 | $4.45 \times 10^{-3}$ |
| Comparative Example 2 | 0.11 | 0 |

The results in Table 1 demonstrate that the laminated bodies produced by the methods described effectively render the bodies impermeable to a level comparable to that of the commercial material of Comparative Example 2. Bulk conductivity of the laminated bodies can be made comparable to that of Comparative Example 2 through the use of a polymer layer of higher electrical conductivity, as seen in Examples 3, 4, and 7. However, since the laminated bodies can be produced to smaller thicknesses than the commercial example, the total electrical resistance of a component produced from the examples may be lower. In the case of Examples 2 and 5, in which the polymer layer is of low conductivity, and in the case of Example 6, in which the polymer layer is essentially a dielectric, the electrical resistivity is 1-2 orders of magnitude higher, though still reasonably conductive. That the resistivity of the laminates is lower than the resistivity of the individual polymer film layers, indicates that the graphite flakes which comprise the expanded graphite foil sheet are penetrating into the polymer layer. As the cost of the polymer layer is proportional to the amount of carbon filler (i.e., highly conductive films being the most expensive and un-filled films being the least expensive), Examples 2, 5, and 6 may be utilized in applications in which lowest cost is of higher priority than very low electrical resistance.

While presently preferred embodiments of the present invention have been described in detail above, it should be understood that various other adaptations and/or modifications of the invention can be made by those persons who are particularly skilled in the art without departing from either the spirit of the invention or the scope of the appended claims.

What is claimed is:
1. A laminated body, consisting of:
a first layer of polymer film,
a first layer of graphite foil, and
wherein the first layer of graphite foil is in direct contact with the first layer of polymer film, and
wherein the first layer of graphite foil is laminated to the first layer of polymer film, such that individual flakes of the graphite foil pierce the polymer film, thereby rendering the laminated body electrically conductive in a through-plane direction and substantially impermeable to air.
2. The laminated body of claim 1, wherein the first layer of polymer film comprises an electrically conductive filler.
3. The laminated body of claim 1, wherein the first layer of polymer film comprises an electrically conductive filler and polyethylene.
4. The laminated body of claim 1, wherein the first layer of polymer film comprises an electrically conductive carbon filler and polyethylene.
5. The laminated body of claim 4, wherein the mass density of the laminated body is between 1.03 g/cm3 and 1.51 g/cm3.
6. The laminated body of claim 1, wherein the mass density of the laminated body is between 1.03 g/cm3 and 1.51 g/cm3.
7. A laminated body, comprising:
a first layer of polymer film,
a first layer of graphite foil, and
a second layer of polymer film,
wherein the first layer of graphite foil is in direct contact with each of the first layer of polymer film and the second layer of polymer film, and
wherein the first layer of graphite foil is laminated between the first layer of polymer film and the second layer of polymer film, such that individual flakes of the graphite foil pierce the first and second polymer films, thereby rendering the laminated body electrically conductive in a through-plane direction and substantially impermeable to air.

8. The laminated body of claim 7, wherein the first layer of polymer film comprises an electrically conductive filler.

9. The laminated body of claim 7, wherein the first layer of polymer film comprises an electrically conductive filler and polyethylene.

10. The laminated body of claim 7, wherein the first layer of polymer film comprises an electrically conductive carbon filler and polyethylene.

11. The laminated body of claim 10, wherein the mass density of the laminated body is between 1.03 g/cm3 and 1.51 g/cm3.

12. The laminated body of claim 7, wherein the mass density of the laminated body is between 1.03 g/cm3 and 1.51 g/cm3.

13. The laminated body of claim 7, wherein the first and second layers of polymer film are electrically insulating.

\* \* \* \* \*

12